United States Patent [19]

Albertazzi

[11] 4,062,124
[45] Dec. 13, 1977

[54] APPARATUS FOR MEASURING ERRORS IN CONCENTRICITY RELATIVE TO TWO SURFACES OF ROTATION

[75] Inventor: Gastone Albertazzi, Bologna, Italy

[73] Assignee: Finike Italiana Marposs Soc. In Accomandita Semplice di Mario Possati & C., Bentivoglio, Italy

[21] Appl. No.: 692,187

[22] Filed: June 2, 1976

[30] Foreign Application Priority Data

June 19, 1975  Italy .................................... 3458/75

[51] Int. Cl.² ............................................... G01B 5/25
[52] U.S. Cl. ................................................. 33/174 Q
[58] Field of Search ............. 33/174 Q, 178 E, 178 R, 33/172 E, 147 K

[56] References Cited

U.S. PATENT DOCUMENTS 2,766,532  10/1956  Eisele ................................. 33/174 Q

FOREIGN PATENT DOCUMENTS 1,032,121  6/1966  United Kingdom ............. 33/174 Q Primary Examiner—Harry N. Haroian
Attorney, Agent, or Firm—Stevens, Davis, Miller & Mosher

[57] ABSTRACT

Apparatus for measuring errors in concentricity relative to first and second coaxial surfaces of rotation formed within a hole of a mechanical part which includes a first support for the part, a second support, a first mechanical reference element supported by the second support to cooperate with the first of the surfaces of rotation, a measurement device associated with the first mechanical reference element to cooperate with the second surface of rotation and effect dimensional measurements thereon, second mechanical reference elements supported by the second support and rigidly connected to the first mechanical reference element, a rigid member connected to the first mechanical reference element, a wire and a spring interconnecting the second support and the rigid member, a spring arranged between the first and second mechanical reference elements and the second support to permit simultaneously the first mechanical reference element to remain in contact with the first surface of rotation and the second mechanical reference elements to cooperate with at least one point of a first section of the second surface of rotation, a mandrel adapted to produce a substantially rotary relative movement between the part and the second support and a processing device connected to the measuring device to carry out during relative motion of the part dimensional measurements on a second section of the second surface of rotation.

9 Claims, 3 Drawing Figures

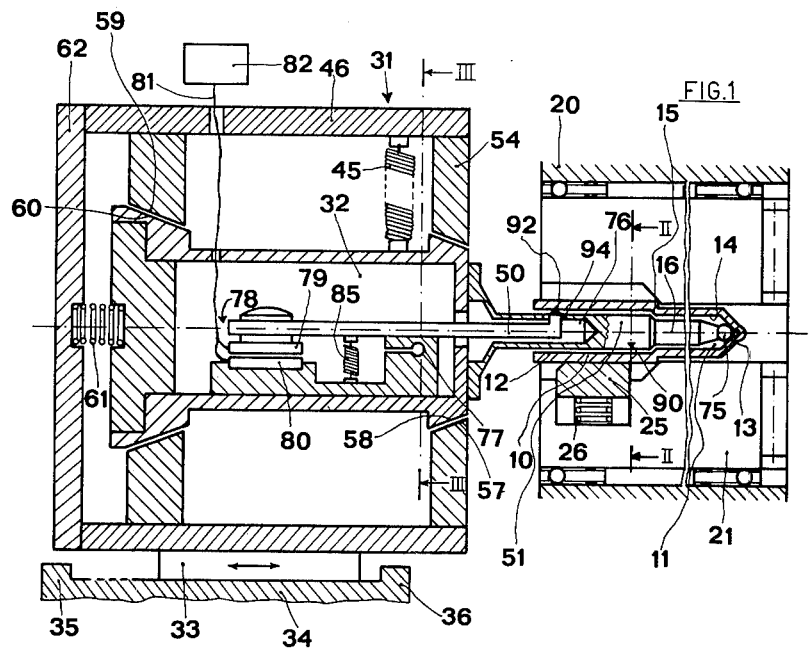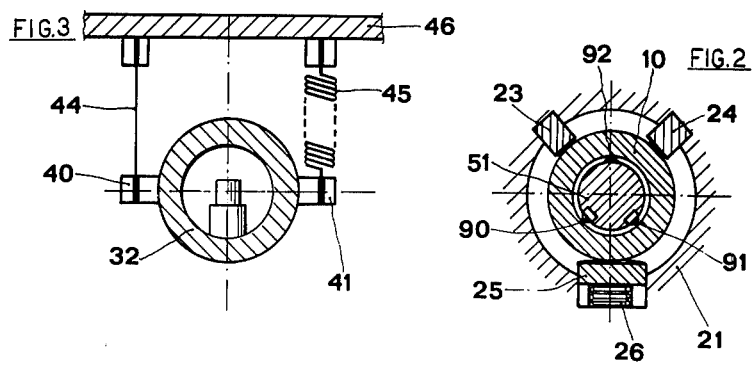

APPARATUS FOR MEASURING ERRORS IN CONCENTRICITY RELATIVE TO TWO SURFACES OF ROTATION

The present invention relates to an apparatus for the measuring of errors in concentricity relative to two surfaces of rotation which are nominally coaxial and define a hole in a mechanical part, comprising a first support for the part, a second support, mechanical reference means supported by the second support to cooperate with the first of the surfaces of rotation, and measuring means associated with the mechanical reference means to cooperate with the second surface of rotation in order to carry out measurements of dimensions on it. In particular, the invention relates to the measurement of errors of concentricity relative to the inner cylindrical sealing surface and the conical end seat of an injector body for a diesel-type engine.

Apparatus for the measurement of errors in concentricity relative to a conical seat and a cylindrical surface which are nominally coaxial, are already known.

In Petty Patent (Gebrauchsmuster) No. 1,972,703 of the Federal Republic of Germany there is described an apparatus for the measurement of the concentricity between a valve seat and the corresponding valve-guide hole, formed of a plug comprising a cylindrical portion adapted to be introduced into the valve-guide hole, a stop body adapted to cooperate with the valve seat and two pneumatic measurement nozzles adapted to act on separate sections of the valve-guide hole. In Italian Pat. No. 983,308 there is also described an apparatus for the measurement of errors in concentricity on a valve seat and on the respective valve-guide hole.

This apparatus comprises a measurement plug having four measurement feelers, two of which act on the valve seat and the other two on the valve-guide hole.

The measurment feelers are supported by movable arms associated with respective electronic position transducers. From the processing of the output signals of the transducers the error in concentricity is obtained, understood as the distance of the center of a section of one of the two surfaces (valve seat or valve guide) from the straight line connecting the centers of two sections of the other surface.

The apparatus described in Petty German Pat. No. 1,972,703 has the limits of pneumatic measuring devices, namely a lack of precision and sensitivity, a requirement that the surfaces of the part be perfectly clean during the measurement, and limited promptness of response.

The apparatus described in Italian Pat. No. 983,308 is not adapted to carry out measurements on surfaces of very small diameter due to the presence of four measuring arms with respective pivots, returns, etc., the dimensions of which cannot be reduced beyond certain limits without jeopardizing the necessary mechanical rigidity.

The object of the present invention is to provide an apparatus for the measurement of errors in concentricity on two inner surfaces of rotation the diameter of which may be even very small (up to a minimum value of a few millimeters). Another object of the invention is to provide an apparatus whose operation is completely automatic or lends itself to being made such. These and other objects and advantages are obtained by an apparatus of the type indicated which comprises, in accordance with the invention, further mechanical reference means supported by the second support and rigidly connected with the mechanical reference means; floating connection means and thrust means arranged between the mechanical reference means and/or further mechanical reference means and the second support to permit the mechanical reference means simultaneously to remain in contact with the first surface of rotation and the further mechanical reference means to cooperate with at least one point of a first section of the second surface of rotation; drive means adapted to effect a relative substantially rotary movement between the part and the second support; and processing and indicating means connected to the measurement means, the measurement means comprising a measuring device associated with the reference means and further reference means to carry out during the relative motion dimensional measurements on a second section of the second surface of rotation, the measuring device including an arm having at least one degree of freedom with respect to the mechanical reference means, a feeler fastened to the arm to enter into contact with a point of the second section of the second surface of rotation, and a transducer adapted to supply signals responsive to the linear dimensions of the second section.

The invention will now be described in further detail with reference to the accompanying sheet of drawings, given solely for purposes of illustration and not of limitation, in which:

FIG. 1 is a side view, partially in section, of a preferred embodiment of the invention;

FIGS. 2 and 3 show partially cross-sections of the apparatus of FIG. 1, along the lines II—II and III—III of FIG. 1 respectively.

FIG. 1 shows a mechanical part 10 formed of the body of an injector for a diesel engine.

The injector body 10 has a cavity 11 intended to house the needle of the injector.

The cavity 11 is defined by surfaces of rotation 12, 13, 14, 15 which are nominally coaxial. For the proper operation of the injector it is particularly important to verify inter alia, that the error in coaxiality between the conical seat 13 which cooperates with the point of the needle of the injector and the cylindrical surface 12 which cooperates with the lateral surface of the needle does not exceed a predetermined amount.

In the following it is assumed that neither of the surfaces 12, 13 has any errors in shape. This is normally justified either by the carrying out of previous verifications of shape or by the technology employed in the construction of the injectors. The injector body 10 is supported by a support 20 via a mandrel 21 which is rotatable around an axis 16 which is substantially coincident with the theoretical axis of the injector body 10. The mandrel 21 comprises two fixed jaws 23, 24 and a movable jaw 25 which is urged towards the part 10 by a spring 26. Opposite the support 20 there is a support 31 for a member 32 which together with the system associated with it, which will be described further below, constitutes a measurement head; the support 31 is mounted on a slide 33 which can be moved towards the support 20 and away from it by hydraulic drive devices, not shown, traveling on a base 34 of the apparatus between two stops 35, 36. The member 32 has two transverse horizontal pins 40, 41 visible in FIG. 3 connected by a wire 44 and a spring 45 to an upper plate 46 of the support 31.

The pins 40, 41 are arranged in the vertical plane (perpendicular to the axis 16) passing through the center of gravity of the system suspended by the wire 44 and the spring 45. The description of this system is given further below.

The measuring head is provided with two arms 50, 51 which protrude with respect to a front plate 54 of the support 31. Two frustoconical reference surfaces 57 and 59 are provided on the support 31 and there rest against them respectively two corresponding frustoconical surfaces 58, 60 provided on the member 32. The contact between the frustoconical surfaces 57, 58 and 59, 60 is maintained by means of a spring 61, arranged between the rear plate 62 of the support 31 and the rear part of the member 32, urging the latter towards the front plate 54. The arm 51 which is rigidly fastened to the member 32 has the shape substantially of a cylindrical shaft and terminates in a spherical surface 75. In the portion adjacent to the member 32, the arm has a hole 76 within which the arm 50 is housed. To the arm 50, which may carry out small movements of rotation with respect to the member 32 around a fulcrum 77 there is fastened the movable element 79 of an inductive measurement transducer 78 the stationary element 80 of which is firmly connected with the member 32. The transducer is connected by the conductors 81 with a feed, processing and indicating unit 82. The arm 51 bears two feelers 90, 91 and the arm 50 bears a feeler 92 which protrudes radially from the arm 51 through an opening 94. A spring 85 supplies the arm 50 with the necessary measurement pressure.

The operation of the apparatus is as follows.

The slide 33 is initially in contact with the stop 35 and the arms 50, 51 are in the position furthest away from the support 20.

The injector body 10 is brought in front of the support 20 and is introduced into the mandrel 21 by means of loading devices, not shown.

During this phase, the spring 61 pushes the member 32 against the front plate 54 of the support 31, holding the frustoconical reference surfaces 57, 58 and 59, 60 in contact. At this point the slide 33 starts to advance towards the support 20.

The contact between the frustoconical surfaces 57, 58 and 59, 60 provides assurance that the measurement head is in a well-defined reference position with respect to the supports 20, 31 so that the arm 51 is aligned with the hole 11 of the injector body 10 and can enter therein without striking against the edge.

The aperture at rest and the shape of the feeler 92 are also such as to facilitate introduction into the hole 11.

After a certain stroke of the slide 33, the spherical end 75 of the arm 51 comes into contact with the conical seat 13; this contact prevents the head from effecting any further advance.

The slide 33 however continues to advance until it comes against the stop 36 while the spring 61 is compressed and the reference surfaces 57, 58 and 59, 60 move apart.

The measurement head thus remains suspended from the support 31 by the wire 44 and the spring 45; the length of the wire and the elastic properties of the spring are selected in such a manner as to tend to maintain the head substantially in the reference position which was previously determined by the contact between the surfaces 57, 58 and 59, 60, permitting however limited displacements from this position.

While the contact between the surface 75 and the conical seat 13 is assured by the pressure of the spring 61, the contact between the feelers 90, 91 and 92 and the surface 12 is assured by means of the spring 85 which acts on the arm 50, tending to move the feeler 92 away from the feelers 90, 91 and by means of the suspensions consisting of the wire 44 and spring 45 which, as stated previously, permit limited displacements of the measurement head. The spherical surface 75 and the feelers 90, 91 constitute mechanical references which cooperate with a section of the conical seat 13 and with two points of a section of the cylindrical surface 12 respectively.

The feelers 90, 91 are arranged in such a manner that two straight lines passing through the center of the section of the surface 12 on which the feelers act and through the points of action of the first feeler 90 and the second feeler 91 form an angle of 90°.

Furthermore, the generatrix of the surface 12 determined by the bisector of said angle is diametrically opposite the generatrix on which the feeler 92 acts.

When the slide 33 has reached the stop 36 and the feelers are therefore in measurement position, the mandrel 21 is caused to rotate with respect to the support 20 by means of drive devices, not shown, in such a manner that the injector body 10 rotates around the axis 16.

During the rotation of the body 10, the end 75 remains in contact with the seat 13 along its circumference while the feelers 90, 91 remain in contact with two points of a first section of the surface 12 and the feeler 92 with a point of a second section of the surface 12.

When the surfaces 12, 13 are coaxial, during the rotation of the body 10 the feeler 92 does not undergo any displacement relative to the arm 51 and therefore the signal of the transducer 78 is constant and proportional to the radius of the section of the cylindrical surface 12 on which the said feeler is located, or to the difference between the radius and its nominal value.

When, however, the surfaces 12, 13 are not coaxial, during the rotation of the body 10 relative displacements take place between the movable arm 50 and the member 32 with its fixed arm 51, imposed by the fact that the spherical end 75 continues to touch the conical seat 13 due to the thrust of the spring 61, and the feelers 90, 91 and 92 touch the cylindrical surface 12, due to the thrust of the spring 85.

Consequently, the transducer 78 generates a signal which, depending on the position of the feeler 92 with respect to the arm 51, varies between a maximum value and a minimum.

More precisely, the signal supplied by the transducer depends on the distance of the center of the section of the cylindrical surface 12 identified by the movable feeler 92 from the straight line passing through the center of the spherical end 75 and through the center of the section of the cylindrical surface 12 identified by the feelers 90, 91.

This distance, which is obtained by the unit 82 by simple processing of the signal supplied by the transducer 78 during the relative rotation between body 10 and feelers 90, 91, 92, is taken as concentricity error of the two surfaces 12, 13.

The wire 44, in addition to suspending the measurement head from the support 31, permitting the above mentioned displacements, has the function of preventing the movement of rotation of the part from being transmitted to the head through the contact of the rotating surfaces 12, 13 with the feelers 90, 91, 92 and the spherical end 75.

In order to avoid this, the wire 44 must of course be arranged at a suitable part of the head so as to oppose the twisting moment applied to the part 10 for the reasons indicated above.

After the measurement has been effected, and therefore after a complete rotation of the body 10, the mandrel 21 is stopped and the slide 33 starts its return movement.

At the end of the return movement and therefore when the slide 33 has reached the stop 35, the arms 50, 51 are outside the hole 11 and the member 32 is urged towards the part 54 of the support 31 so that the surfaces 57, 58 and 59, 60 are again in contact and the measurement head is again centered.

The measured body 10 is then unloaded and the operations described are repeated for a following part.

Obviously various changes may be made in the elements which constitute the apparatus without thereby going beyond the scope of the invention.

For example, a floating suspension can be employed for the part 12 rather than for the measurement head, and the movement which permits the exploring of the feelers on the surface 12 can be imparted to the head rather than to the part. Another possible variant consists in replacing the movable arm 50, the feeler 92, and the transducer 78 by a pneumatic measurement system.

With respect to the German Petty Patent cited above, there would be the advantage of being able to use a single pneumatic nozzle rather than two.

What is claimed is:

1. Apparatus for measuring errors in concentricity relative to first and second nominally coaxial surfaces of rotation which define a hole in a mechanical part, comprising a first support for the part, a second support, a first mechanical reference means supported by said second support to cooperate with the first of said surfaces of rotation, measurement means coupled with said first mechanical reference means to cooperate with the second surface of rotation and effect dimensional measurements thereon, a second mechanical reference means supported by said second support and rigidly connected to said first mechanical reference means, floating connecting means and thrust means arranged between said first mechanical reference means and said second mechanical reference means and said second support to permit simultaneously the first said mechanical reference means to remain in contact with the first surface of rotation and said second mechanical reference means to cooperate with at least one point of a first section of said second surface of rotation, rotatable means adapted to produce a substantially rotary relative movement between the part and said second support; and processing and indicating means connected to said measurement means, said measurement means comprising a measuring device mechanically coupled with said first reference means and said second reference means to carry out, during said relative motion, dimensional measurements on a second section of said second surface of rotation, said measuring device including an arm having at least one degree of freedom with respect to said first and second mechanical reference means, a feeler fastened to said arm to enter into contact with a point of said second section of said second surface of rotation, and a transducer adapted to provide signals responsive to the linear dimensions of said second section.

2. The apparatus according to claim 1, wherein said rotatable means comprises a mandrel adapted to support the part and to rotate it around an axis.

3. The apparatus according to claim 2, including a rigid member supported by said second support by means of said floating connecting means, said second support being movable towards and away from the part, said first and second mechanical reference means comprising a rigid arm adapted to be introduced into said hole of said part and to dispose itself along said axis one end of the rigid arm being rigidly connected with said rigid member and the other end terminating with a substantially spherical surface, adapted to cooperate with a circular section of said first rotation surface, said rigid arm comprising, at a cross-section, two fixed feelers adapted to cooperate with two points of said first section of the second surface of rotation, said fixed feelers constituting said second mechanical reference means, said first surface of rotation being conical or frustoconical, and said second surface of rotation being cylindrical.

4. The apparatus according to claim 3, wherein said connecting and thrust means comprise a first elastic element interposed between said second support and said rigid member to exert a thrust adapted to maintain said spherical surface in contact with said circular section of said conical surface.

5. The apparatus according to claim 3, wherein said arm, which has at least one degree of freedom with respect to said first mechanical reference means and said second mechanical reference means, is associated with said rigid member via a fulcrum, and said connecting and thrust means comprise a second elastic element connected between said arm and said rigid member, said second elastic element supplying a thrust adapted to permit the said fixed feelers to cooperate with said two points of the first section of said second surface of rotation and said feeler fastened to said arm to remain in contact with said second section of the second surface of rotation.

6. The apparatus according to claim 5, wherein said rigid member and said second support are provided with mechanical reference elements adapted to cooperate with each other to maintain said rigid member, suspended from said floating connecting means in a position which permits the introduction of said rigid arm into said hole of said part as a result of the approach motion of said second support.

7. The apparatus according to claim 6, wherein said floating correcting means comprise at least one wire and a spring which are connected between said rigid member and said second support, said wire and spring being adapted to permit recoil of said rigid member with respect to said second support as a result of the approach movement of said second support towards said part.

8. The apparatus according to claim 7, wherein said wire and said spring are connected to said rigid member at points lying in the vertical plane passing through the center of gravity of the system suspended from said wire and said spring.

9. An apparatus for measuring errors in concentricity relative to first and second nominally coaxial surfaces of rotation which define a hole in a mechanical part, comprising:
   a first support for said part;
   a second support;
   first mechanical reference means mounted on said second support to cooperate with said first of said surfaces of rotation;

second mechanical reference means arranged on said second support rigidly connected to said first mechanical reference means to cooperate with at least one point of a first section of the second surface of rotation;

measurement means adapted to cooperate with the second surface of rotation to effect measurements of dimensions, said measurement means comprising an arm mounted on said second support and movable with respect to said first and second mechanical reference means; a sensor element mounted on said arm and adapted to cooperate with at least one point of a second section of the second surface of rotation; and transducer means adapted to supply signals responsive to the position of said arm with respect to said first and second mechanical reference means;

rotatable means adapted to produce a substantially rotary relative motion between said part and said first support; and processing and indicating means connected to said transducer means to process the signals supplied by them during said relative motion.

* * * * *